(No Model.)
E. T. JARRETT.
HARROW OR RAKE ATTACHMENT FOR PLOWS AND CULTIVATORS.
No. 329,745. Patented Nov. 3, 1885.
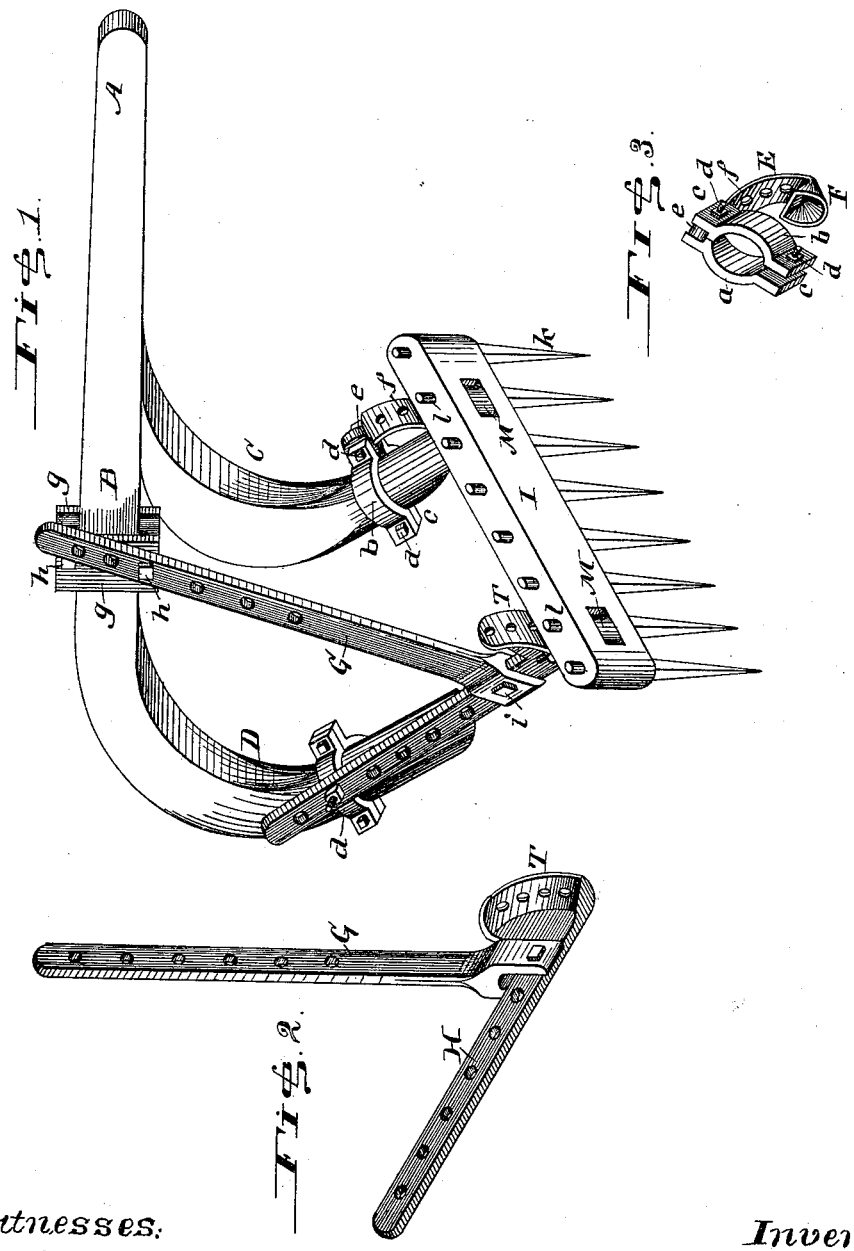

UNITED STATES PATENT OFFICE.

ELISHA T. JARRETT, OF MELISSA, TEXAS.

HARROW AND RAKE ATTACHMENT FOR PLOWS AND CULTIVATORS.

SPECIFICATION forming part of Letters Patent No. 329,745, dated November 3, 1885.

Application filed May 13, 1885. Serial No. 165,340. (No model.)

*To all whom it may concern:*

Be it known that I, ELISHA T. JARRETT, a citizen of the United States, residing at Melissa, in the county of Collin and State of Texas, have invented certain new and useful Improvements in Harrow or Rake Attachments for Plows and Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to attachments for plows and cultivators; and it consists more particularly in a harrow or rake device adapted for ready application to any of the common forms of double plows or cultivators.

In the accompanying drawings, Figure 1 is a perspective view of a double plow or cultivator having my improvements attached thereto. Fig. 2 is a detail perspective view of the adjusting means, and Fig. 3 is a detail perspective view of one of the devices for securing the parts to one of the standards.

A B represent the beams of a double standard cultivator or plow, and C D the curved depending standards of the same. The lower portion of the standard C is embraced by means of plates $a$ $b$, which conjointly present a central circular opening, and are each extended at each end to form ears $c$ for the transverse passage of securing-bolts $d$. The said ears are located sufficiently far apart to permit the perforated tongue $e$ of a depending shoe, E, to be pivoted on the front bolt, $d$, of the clamp. The said shoe E consists of a flat depending portion, $f$, which is curved outward, and is provided with a vertical series of perforations, the said curved portions $f$ carrying integrally at its lower end, at the rear side thereof, a cap or shell, F, designed to fit over the lower end of the standard C. Vertical plates $g$ $g$ are located, respectively, at each side of the beam B, and are held in position by means of bolts $h$, passing transversely through said plates $g$ $g$ above and below the beam. The end of one of the bolts $h$ projects a short distance beyond the side of said plate, to act as a stud on which to hang a vertically-depending bar, G, the lower end of which is bifurcated to receive and pivotally retain by a bolt, $i$, a beam, H, the front end of which carries integrally a vertical shoe portion, T, provided with a vertical series of perforations and curved outward, as shown. The beam H is also provided with a series of perforations adapted to be engaged by a bolt or other suitable projection carried by the adjustable clip $d$ on the standard D.

I refers to a bar, which carries a series of rake or harrow teeth, $k$, made fast to said bar by nuts on top thereof. The said bar I is cut away or recessed at or near each end, so as to expose the shank $l$ of one of the teeth, in order to permit the same to serve as a vertical pivot for a lug, M, the free end of which is reduced. As shown in Fig. 1, the lugs M are inserted, respectively, in the perforations of the curved portion $f$ of the shoe E, and in the shoe portion T of the beam H. The ends of each lug M are threaded to receive a securing-bolt.

From the arrangement of parts disclosed by Fig. 1, in connection with the description heretofore set forth, it will be obvious that the device is specially adapted for the cultivation of young corn and cotton; that the connection of the bar G with the beam B may be readily changed to either elevate or depress the end of the rake or harrow attachment in order to accommodate it to the sides of hills and mounds, and, further, that the beam H may be so adjusted as to secure the rake or harrow in a position inclining toward the rear to enable the attachment to be readily cleared of weeds. It will also be apparent that the attachment may readily be applied to any existing double-standard plow or cultivator.

Having thus described my invention, what I claim, and desire to secure by Letters Patent, is—

1. The combination, in a rake or harrow attachment for plows, of a clamp provided with a curved perforated shoe, and adapted to be secured to the standard of one beam, a rake or harrow secured at one end to said shoe, a bar, means for connecting the same to a second beam, the lower end of said bar being connected to the other end of the rake or harrow, substantially as and for the purpose set forth.

2. The combination, with a double-beam plow or cultivator, of a clamp secured to the standard of one beam, and provided with a curved perforated shoe, a bar, also provided with a curved perforated shoe and depending from the other beam, a rake or harrow connected to said shoes, and means for securing said bar in a raised or lowered position, substantially as set forth.

3. The combination, with a plow or cultivator, of a rake or harrow attachment, substantially as described, and a beam, H, provided with a curved perforated shoe, T, connected to said attachment, as specified, said beam being provided with a series of perforations, and a bolt or projection for securing it to the standard, substantially as set forth.

4. The combination, with a plow or cultivator, of a clamp connected to the standard, and having a curved perforated shoe portion, a rake or harrow having a pivoted bolt or lug adapted to engage one of the perforations in said shoe portion, and devices for supporting the other end of said rake or harrow, substantially as set forth.

5. The combination, with a plow or cultivator, of a clamp connected to the standard of the plow or cultivator, having a perforated shoe portion, and a cap or shell to fit over the end of said standard, and a rake or harrow attachment connected to said shoe portion, and supported at its outer end, substantially as set forth.

6. The combination, with a plow or cultivator, of a clamp secured to one of the standards, and having a perforated shoe portion, a beam, H, connected to a second standard, extending forward and terminating in a perforated curved shoe, and a rake or cultivator having pivoted bolts adapted for engagement with said shoe portions, substantially as set forth.

In testimony whereof I affix my signature in presence of two witnesses.

ELISHA T. JARRETT.

Witnesses:
  E. H. LAIR,
  F. H. LAIR.